United States Patent [19]

Poeppleman

[11] Patent Number: 5,598,443
[45] Date of Patent: Jan. 28, 1997

[54] METHOD AND APPARATUS FOR SEPARATING DATA AND CLOCK FROM A DIGITAL DATA STREAM

[75] Inventor: Alan D. Poeppleman, Fort Collins, Colo.

[73] Assignees: AT&T Global Information Solutions Company (aka NCR Corporation), Dayton, Ohio; Hyundai Electronics America, San Jose, Calif.; Symbios Logic Inc., Fort Collins, Colo.

[21] Appl. No.: 247,386

[22] Filed: May 23, 1994

[51] Int. Cl.⁶ .................. H04L 7/02; H04L 7/00
[52] U.S. Cl. ........................ 375/359; 375/371
[58] Field of Search .................. 375/359, 354, 375/371, 373–376, 362, 355; 327/141; 360/51

[56] References Cited

U.S. PATENT DOCUMENTS

| | | | |
|---|---|---|---|
| 4,472,818 | 9/1984 | Zapisek et al. | 375/371 |
| 4,633,488 | 12/1986 | Shaw | 375/359 |
| 4,796,280 | 1/1989 | Nesin et al. | 375/110 |
| 5,260,842 | 11/1993 | Leake et al. | 375/359 |

*Primary Examiner*—Stephen Chin
*Assistant Examiner*—Hai H. Phan
*Attorney, Agent, or Firm*—David K. Lucente; Wayne P. Bailey

[57] ABSTRACT

A digital data separator is provided for separating clock information and data from a data stream which is subject to varying amounts of undesired jitter which tend to corrupt the data. A read data window of controlled duration is generated for sampling the input data. The current best estimate of the duration of the read data window is stored in a period register as a period register value. The period register value minus one is loaded into a time register as the time register value. A count down cycle is performed by subtracting a value of one from the time register value in each clock cycle during the course of the count down cycle. The read data window is toggled to begin a new read data window when the time register value is near zero, the value remaining in the time register being designated the remaining value.

25 Claims, 7 Drawing Sheets

METHOD AND APPARATUS FOR SEPARATING DATA AND CLOCK FROM A DIGITAL DATA STREAM

BACKGROUND OF THE INVENTION

This invention relates in general to clock and data recovery systems, and more particularly, to digital data separators.

To receive a transmitted digital data stream, it is necessary to recover the clock signal of the data stream in order to synchronize to the stream. Once synchronization to the stream is established, the relative locations of the individual pulses of that stream are known and the data contained in the stream can be recovered.

In cases where the data stream exhibits jitter and speed variations, such as when the stream originates from a floppy disk or magnetic tape, the recovery of data can be impaired by these conditions. For example, when a data stream is encoded in the known MFM (Modified Frequency Modulated) format and the stream originates from a floppy disk or magnetic tape, the pulses which form the digital data stream are made more difficult to receive by these undesirable conditions. In this encoding technique, the data pulses are derived from the sensing of magnetic flux changes recorded on magnetic media. These data pulses are susceptible to a "peak shift jitter" phenomena and other forms of data jitter. Moreover, the digital data stream is susceptible to both long and short term speed variations resulting from motor speed variation in the disk or tape drive, movement of an elastic medium over a surface with friction and other sources. For these reasons, in order for a digital data separator to operate effectively, the digital data separator should tolerate a large degree of jitter in the data stream. The digital data separator should also have the ability to track long and short term speed variations.

In the design of digital data separators, jitter tolerance and speed tracking are opposed goals that are traded off after a certain point. It is desirable to have a digital data separator which uses as much information as possible to meet these opposing goals. Loss of information through round-off error, quantization error such as determining when the first input data pulse has arrived, or other sources can directly result in the degradation of performance of a digital data separator.

SUMMARY OF THE INVENTION

Accordingly, one object of the present invention is to provide a digital data separator which exhibits tolerance to jitter and speed variations in the digital data stream.

In accordance with one embodiment of the present invention, a digital data separator is provided for separating data and clock information from a data stream. The data separator includes a datapath to which input data is provided. The data separator also includes a window generator, coupled to the datapath, for generating a read data window for the data stream. The separator also includes a period register, situated in the datapath, for storing a current best estimate of the duration of the read data window as a period register value. The data separator still further includes a time register, situated in the datapath, to which the period register value minus one is added at the start of a count down cycle (a phase adjustment value minus one is also added into the time register during a phase adjustment). The digital data separator also includes a down counter, coupled to the datapath, for performing a count down cycle by subtracting a value of one from the time register value in each clock cycle during the course of the count down cycle. Further, the digital data separator includes a toggling apparatus, coupled to the datapath, for toggling the read data window to begin a new read data window when the time register value is near zero, the value remaining in the time register being designated the remaining value.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings in which:

DETAILED DESCRIPTION OF THE INVENTION

Figure 1:
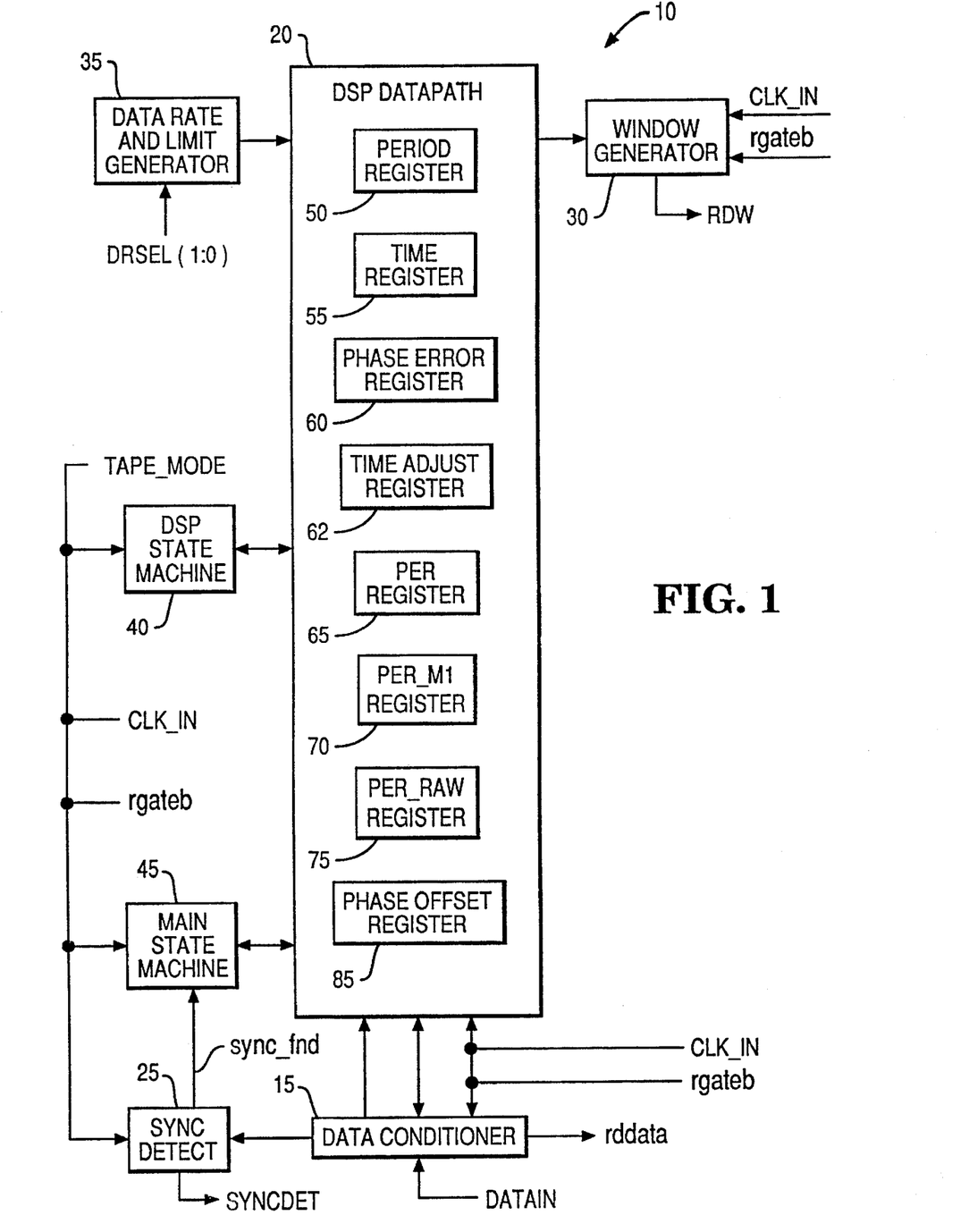
FIG. 1 is a block diagram of the digital data separator of the present invention.

FIG. 1 depicts one embodiment of the digital data separator of the present invention as digital data separator 10. The interconnection of the blocks forming separator 10 will be discussed first followed by a discussion of their function.

The incoming data stream from which data is to be separated is represented by the DATAIN signal. The DATAIN signal is provided to a data conditioner 15 as shown. For example, the DATAIN signal may be an MFM data signal derived from a disk drive. The DATAIN signal is a raw signal from such a disk drive as observed prior to synchronization. It is noted that DATAIN is synchronized with the CLK_IN clock signal. Data conditioner 15 includes an "rddata" output at which the MFM data output stream is provided. This signal is a delayed and synchronized version of the raw DATAIN signal.

Data conditioner 15 is coupled to a digital signal processor (DSP) datapath block 20 and to a sync detect block 25. Sync detect block 25 provides a SYNCDET signal or sync detect signal which goes high once synchronism with the clock of the incoming DATAIN data stream is established. When the SYNCDET signal goes high, digital data separator 10 switches from a high gain to a low gain mode. Sync detect occurs after 16 consecutive zeroes are detected in this particular embodiment of the digital data separator.

A data window generator 30 is coupled to the DSP data path block 20 to generate the data window employed by digital data separator 10. A data rate and limit generator 35 is also coupled to DSP data path block 20 to control the data rate employed by the separator 10. A DSP state machine 40 and a main state machine 45 are also coupled to DSP data path block 20 as shown in FIG. 1 to facilitate data separation.

The pinout of digital data separator 10 is now discussed prior to describing the operation of the component blocks thereof. For convenience, the name of each pin and the signal provided to each pin are the same. Separator 10 includes a CLK_IN pin which is coupled to all blocks except data rate and limit generator 35. A clock input signal, for example a 24 MHz signal in one embodiment, is provided to the CLK_IN pin to provide separator 10 with a time base. The DATAIN input pin receives the raw input signal DATAIN from which data is to be separated. More particularly, in the case of an MFM disk drive, this DATAIN signal is the MFM data stream input. The DATAIN signal is not synchronized with the clock of separator 10. In this particular embodiment, the DATAIN signal exhibits a high true pulse with a duration of greater than 50 nS.

Data conditioner 15 provides an "rddata" output signal which is a delayed and synchronized version of the raw DATAIN signal. The window generator 30 of separator 10 includes a read data window (RDW) output pin at which the read data window employed by separator 10 is generated. The RDW or read data window surrounds the "rddata" pulses from data conditioner 15. The data bits of the MFM encoded "rddata" are in the high RDW window and the clock bits are in the low RDW window once SYNC is detected.

Data rate and limit generator 35 includes a DRSEL(1:0) input to which a DRSEL (data rate selection) signal is provided. The data rate is selected according to the value of the DRSEL signal.

A TAPE_MODE signal is provided to DSP state machine 40, main state machine 45 and sync detect circuit 25. A tape mode is selected when TAPE_MODE is high and a floppy disk mode is selected when TAPE_MODE is low.

A "rgateb" or read gate bar signal is provided to all blocks except generator 35 as shown. When "rgateb" is high, digital data separator 10 is reset. When "rgateb" is low, separator 10 starts up in a sync search mode.

Sync detect circuit 25 generates a SYNCDET signal at a SYNCDET output thereof. The SYNCDET signal goes high once SYNC is detected and, in response, digital data separator 10 switches from high gain to low gain. Sync detect occurs after 16 consecutive zeroes are detected in this particular embodiment of the invention.

A brief overview of the operation of digital data separator 10 is now provided before discussing separator 10 in more detail. Separator 10 includes a period register 50 situated within DSP datapath block 20. Period register 50 holds the current best estimate of the duration of the Read Data Window which is used to sample the DATAIN input data stream. The current best estimate value is in units of clock periods. In this particular embodiment, the current best estimate of the Read Data Window duration is accurate to 8 fractional binary places. The current best estimate value minus one (1) is added to a time register 55 in DSP datapath block 20 and a count down cycle begins. More particularly, for each clock cycle a value of one is subtracted from the value in time register 55. When the value in time register 55 is near zero, the Read Data Window is toggled and a new cycle is commenced. Normally, the Read Data Window is toggled when the time register value is less than 0.5. A special case delays the toggling to a value less than 0.0 when the DATAIN pulse is captured at the end of the window and captured by the falling edge of CLK_IN first. The value in period register 50 minus one is again added to the remaining value in time register 55. When a data input pulse (of DATAIN) is received by separator 10, its arrival time is measured with respect to the center of the Read Data Window to calculate the amount of error. This error calculation is performed by subtracting the value in time register 55 at the time the pulse arrives from one-half the period (minus a value of 0.5 if the DATAIN pulse was captured by the falling edge of CLK_IN first) and holding the result in phase error register 60 within DSP datapath block 20. The resultant phase error value is used to update period register 50 and further to update time register 55 for a phase adjustment by an amount based upon selected feedback parameters.

Different feedback parameters are selected depending on whether the system is in Tape mode or Floppy mode, or High Gain mode or Low Gain mode. Phase adjustment is done by adding the phase error value times the phase feedback parameter ($\beta$) to the time register value.

The blocks which form digital data separator 10 of FIG. 1 are now described in more detail. Data rate and limit generator 35 decodes the Data Rate Select inputs (DRSEL(1:0)) into four distinct values for the nominal read data window period. In this particular embodiment of the invention, when a DRSEL signal of "10" is provided to this input, a 250 Kbs data rate is selected and when the DRSEL signal is a "01", then a data rate of 300 Kbs is selected; when the DRSEL signal is "00", then a data rate of 500 Kbs is selected and when the DRSEL signal is a "11", then a data rate of 1 Mbs is selected. The decoded DRSEL values are expressed in terms of the number of clock cycles per data window. For example, at a 1 Mbs data rate for data rate and limit generator 35, the nominal read data window (RDW) period is 500 nS or 12 cycles of a 24 MHz input clock (CLKIN). The values used are accurate to 8 fractional binary places. This nominal RDW period value is also used to calculate the upper and lower limits to which the read data window period will be clamped. The upper limit is set to 1.125 times the nominal RDW period value while the lower limit is set to 0.875 times the nominal RDW period value in this particular embodiment.

Data conditioner 15 receives the raw serial input data (DATAIN) from the particular disk drive, tape or other source for which digital data separation is desired. Data conditioner 15 synchronizes the DATAIN signal and generates a one clock period wide pulse. This pulse is used in separator 10 for control and to help generate the output "rddata". Data conditioner 15 also detects whether the DATAIN signal was clocked first by the negative or positive edge of the CLK_IN. Sync detect circuit 25 monitors the incoming DATAIN data stream and issues a sync_fnd signal when 16 consecutive 0's of MFM encoded data have been detected. Counting of these consecutive 0's begins when main state machine 45 is in the high gain mode. It is noted that the high gain mode allows digital data separator 10 to converge to the initial speed variation faster. The count is incremented whenever an additional bit is found in the clock field of the recreated data window. If a bad sync condition (for example, a bit in the data field or a clock field that expires without a bit detected), the count is reset to zero. The "sync_fnd" signal is used to switch separator 10 from high gain mode to the more jitter tolerant low gain mode. A SYNCDET signal is also output from digital data separator 10 when sync is achieved or detected.

Digital data separator 10 includes a main state machine 45 which controls the global functions of the separator. Main state machine 45 has 5 states as shown in the state diagram of main state machine 45 of FIG. 2. The M_IDLE state is the initial state of main state machine 45. A high "rgateb" signal will always return the main state machine to the M_IDLE state as indicated in the state diagram. A bad sync condition (bad_sync) when in HI_GAIN mode also causes a return to the M_IDLE state.

Figure 2:
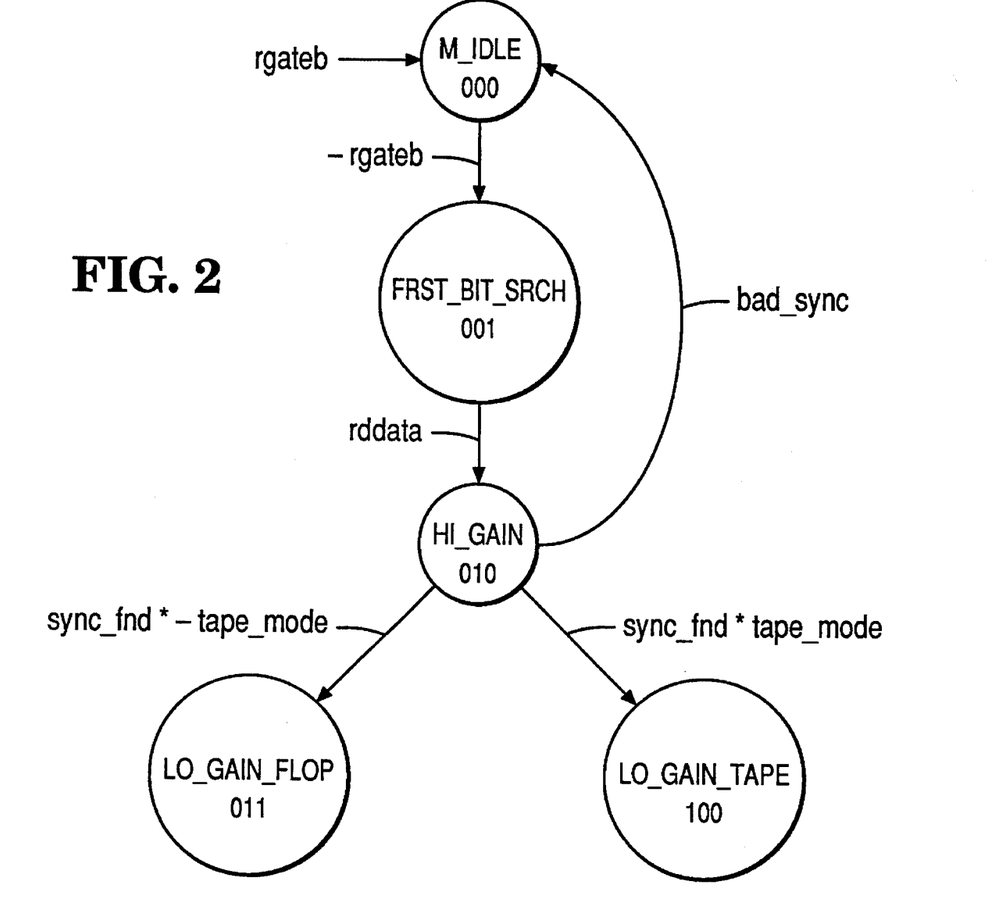
FIG. 2 is a state diagram of the main state machine employed by the digital data separator of FIG. 1.

When rgateb goes low, the FRST_BIT_SRCH or first bit search state is entered. The main state machine remains in this state searching for the first incoming bits of data input (DATAIN). During this state, the T_REG register (namely time register 55) is initialized to one-half of the nominal read data window period. When an incoming data bit is detected, this state is exited and the T_REG register is allowed to decrement. This action permits digital data separator 10 to start operating with zero phase error on the first bit.

The HI_GAIN state is entered from the FRST_BIT_SRCH state after a rddata pulse has been produced from DATAIN. During this state, a phase adjustment factor of $7/16$ of the phase error is used and a period adjustment of $1/16$ of the phase error is used. These larger feedback factors allow separator 10 to converge on the initial data speed at a faster rate without losing tracking. However, these larger factors also reduce jitter tolerance. During the HI_GAIN state the number of consecutive 0's of MFM encoded data is counted.

When the sync count reaches 16, the main state machine exits the HI_GAIN state and enters a LO_GAIN state. If a bad sync condition occurs, the main state machine reverts back to the M_IDLE state to begin a new input data sequence. The LO_GAIN state that the state machine enters is the LO_GAIN_FLOP state or the LO_GAIN_TAPE state. The LO_GAIN_FLOP state is entered after the sync found condition, namely 16 consecutive bits of MFM encoded data, have been received in the HI_GAIN state and the TAPE_MODE signal is not set (i.e. sync_fnd* tape_mode). During this LO_GAIN_FLOP state, a phase adjustment factor of $15/128$ is employed in one particular embodiment and the period adjustment factor is reduced to $1/128$ of the phase error. These smaller feedback factors increase the jitter tolerance of the separator at the expense of lower instantaneous speed variation (ISV) tracking ability. The main state machine 45 will remain in the LO_GAIN_FLOP state until "rgateb" is asserted and another data sequence is started.

The LO_GAIN_TAPE state is entered when the sync condition is found in the HI_GAIN state and the TAPE_MODE signal is set (i.e. sync_fnd*tape_mode). In this LO_GAIN_TAPE state, a phase adjustment factor of $7/16$ of the phase error is employed and a period adjustment of $1/16$ of the phase error is used in one particular embodiment. These larger feedback parameters allow for a greater ISV tracking which is desirable for tape mode, but at the expense of less jitter tolerance. These parameters are the same as in the HI_GAIN mode.

Digital Data Processing (DSP) state machine 40 controls the flow of the DSP data path, namely block 20. DSP datapath block 20 performs additions, subtractions, multiplications and multiplexing of register contents and constants. The control of the operations performed by digital data separator 10 and when such operations are performed are facilitated by DSP state machine 40.

Figure 3:
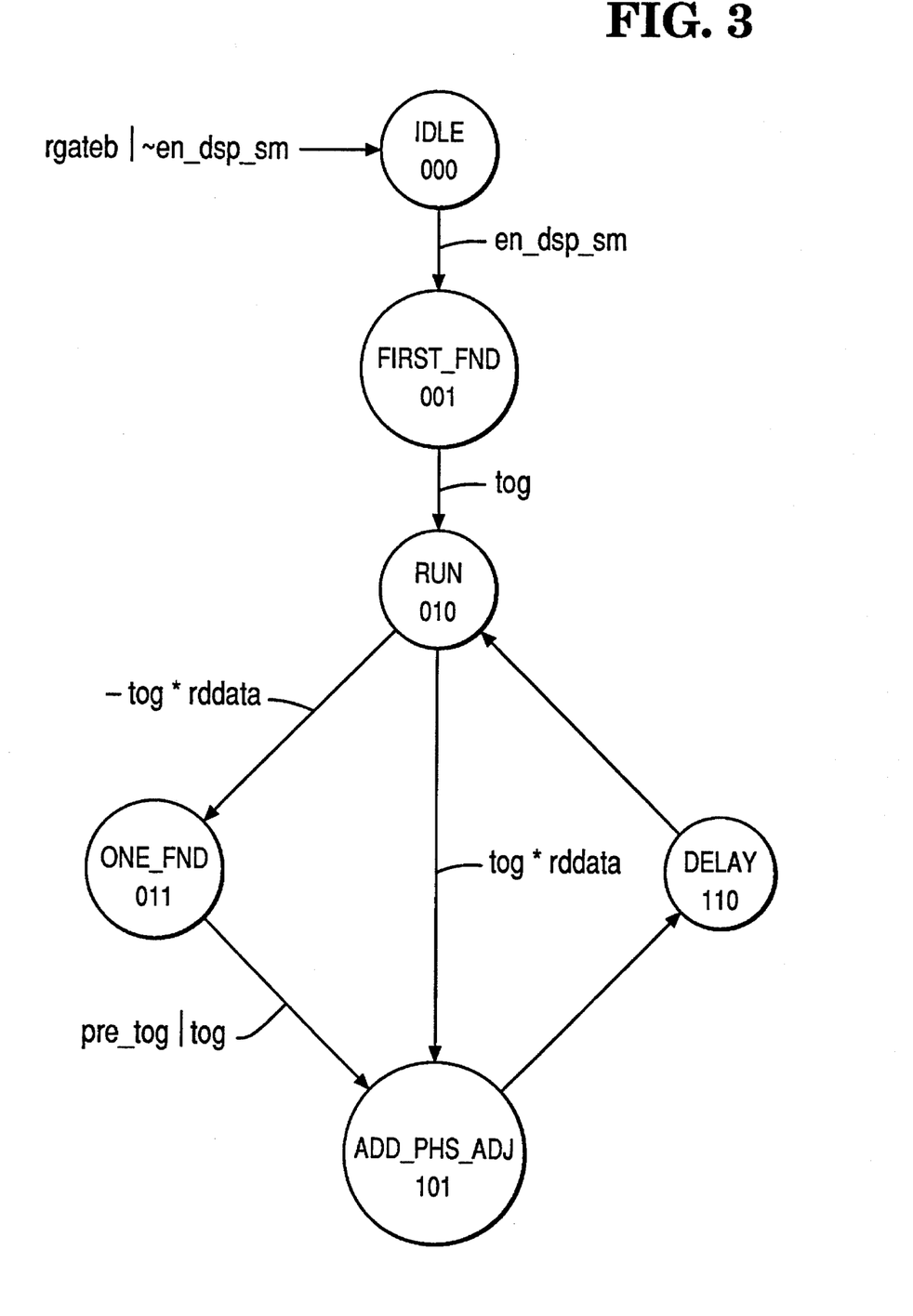
FIG. 3 is a state diagram of the DSP state machine employed by the digital data separator of FIG. 1.

A state diagram of DSP state machine is shown in FIG. 3. The initial state of DSP state machine 40, namely the IDLE state, is entered whenever "rgateb" signal is asserted or when the "en_dsp_sm" (enable DSP state machine) signal is asserted. The FIRST_FND state is entered when the DSP state machine is enabled during IDLE. Digital data separator 10 is searching for the first data bit while in this state. Since the initial phase error feature described above requires different control than the free running operation, this state is necessary to facilitate the control of the DSP datapath during this start-up phase. This FIRST_FND state is maintained until the first data bit is received, the time register 55 (T REG) counts down to near zero, and the "tog" (toggle the Read Data Window) signal is generated. Once this phase is complete, the normal mode of operation of the DSP data path (RUN mode) begins.

The RUN state of the DSP state machine is the primary state of this state machine. During normal operation, the RUN state is maintained until a data bit is received and "rddata" is generated. If the "rddata" signal is not received at the immediate end of the count cycle, then the state machine proceeds to the ONE_FND (a one found) state. However, if the "rddata" signal is asserted at the immediate end of the count down cycle (i.e. when "tog" is generated to toggle the window"), the state machine proceeds directly to the ADD_PHS_ADJ (add phase adjustment) state. This is done to quicken the update cycle and permits the state machine to return to the RUN state sooner to prepare for the next cycle or window.

The ONE_FND state (a one found) is a holding state that allows the count down cycle to complete before the adjustment cycle begins. The ONE_FND state is maintained until the "pre_tog" or "tog" signal is asserted near the end of the count down cycle.

The ADD_PHS_ADJ (add phase adjustment) state is entered near or at the end of the count down cycle after a data bit has been received. When a new count down cycle begins, the current period value minus one is added to the remainder of the time register 55 (T REG). After this, the phase adjustment is made by adding the PHASE_ADJ value minus one into the contents of time register 55. Thus, the length of the succeeding data window will be increased or decreased accordingly by the value of the phase adjustment. This adjustment is made during the ADD_PHS_ADJ state.

The DELAY state is entered automatically from the ADD_PHS_ADJ state. The actual RDW period adjustment is performed in the ADD_PHS_ADJ state discussed above, the DELAY state is used for timing purposes. The DELAY state automatically exits into the RUN state.

The DSP datapath 20 performs calculations on the registers therein and constants therein to determine the toggle time of the read data window, the phase error of the incoming data with respect to the calculated center of the read data window, the phase adjustment factor and the period adjustment factor. The registers employed by the DSP datapath 20 and their corresponding functions are described below. The registers in DSP datapath 20 are 15 bits long in this particular embodiment. The upper bit is used as a sign bit and the lower 8 bits are used as fractional binary places to retain the required accuracy and to reduce round-off error.

T REG or time register 55 is a 15 bit register with 8 fractional binary places. Time register 55 is decremented by one every clock cycle during normal operation. When the value of T REG is less than 0.5, the read data window is toggled. If a data bit from the MFM data stream was detected before or during the toggle time, a phase error will be calculated from its arrival time and the calculated center of the data window. After the toggle time, the calculated period (length of the data window) in terms of clock ticks, will be added into T REG. Any remainder left in T REG and any binary places in period register 50 are included in the addition to avoid error accumulation due to round-off error. If the previous window contained an MFM data bit, the calculated phase adjustment will be added into T REG in the subsequent clock cycles. To implement a zero phase error start-up feature, one half the period value can be loaded into T REG when the first data bit is detected and the algorithm started from that point.

The T ADJ register (time adjustment register) 62 is a 15 bit register with 8 binary places. It contains the value to be added into T REG at the appropriate time. This value will be negative one (−1) most of the time, with a value of the phase adjustment minus one at appropriate other times. The T ADJ register 62 is used as a pipeline register in this particular embodiment to ease implementation.

DSP datapath 20 also includes a PER register 65 which is 15 bits wide with 8 binary places. PER register 65 contains the calculated value for the length of the read data window in terms of clock periods. The PER value is updated during the adjustment phase (after the read data window toggles and data detected), and is limit checked for the PER LOW and PER HI values. During initialization, the nominal period value (PER NOM) is loaded into the PER register 65.

DSP datapath 20 includes a PER_M1 (PER minus one) register 70 which is 15 bits with 8 binary places. PER_M1 register 70 contains the value of the read data window in terms of clock periods minus one. PER_M1 register 70 will be added into the TREG register 55 after the toggle time to begin a new count down sequence.

DSP datapath 20 further includes a PER RAW register 75 which is 15 bits wide with 8 binary places. PER RAW register 75 contains the raw period value before the limit check and acts as a pipeline register to facilitate the implementation of the period adjust flow.

DSP datapath 20 employs a phase adjustment vector (PHASE_ADJ) which contains the amount of phase adjustment to be added into T REG register 55 during the adjustment phase. In the high gain mode, this value will be ½ the calculated phase error. In the low gain floppy mode, this value will be ⅛ the phase error.

DSP datapath 20 further employs a period adjustment vector (PER_ADJ) which contains the amount of period adjustment or delay to be added into the PER_RAW register 75 during the adjustment phase. In one particular embodiment of the invention, this value will be ⅛ the calculated phase error in the high gain mode. In low gain mode, this value will be 1/128 the phase error.

The DSP datapath 20 includes a phase error register 60 (PHASE_ERR) which contains the negated phase error from the last MFM data bit received. This value is calculated by subtracting the T REG contents from the PHASE OFFSET register (normally one half the period) and strobing this value into the PHASE ERR register when a data bit is received. If the back edge of the clock is used to further distinguish the time the data bit has been received, an additional 0.5 is subtracted from this value when the data was detected using the negative edge of the clock before the positive edge.

The DSP datapath 20 also includes a phase offset register (PHASE_OFFSET) 85 which contains the value from which the T REG value is subtracted to yield the phase error. The value of the Phase Offset Register will be one half the Period Register value with an additional offset of −0.5 if the negative edge of the clock is strobed in the DATAIN signal first. This is a pipeline register to ease the implementation of the phase error calculation.

Window Generator block 30 monitors the value of the Time Register (T REG) 55 and when its value is near zero, toggles the Read Data Window (RDW). The actual toggling of the Read Data Window is modified slightly if the input data is received near the Read Data Window edge and if the input data was strobed by the negative edge of the clock first.

Figure 4:
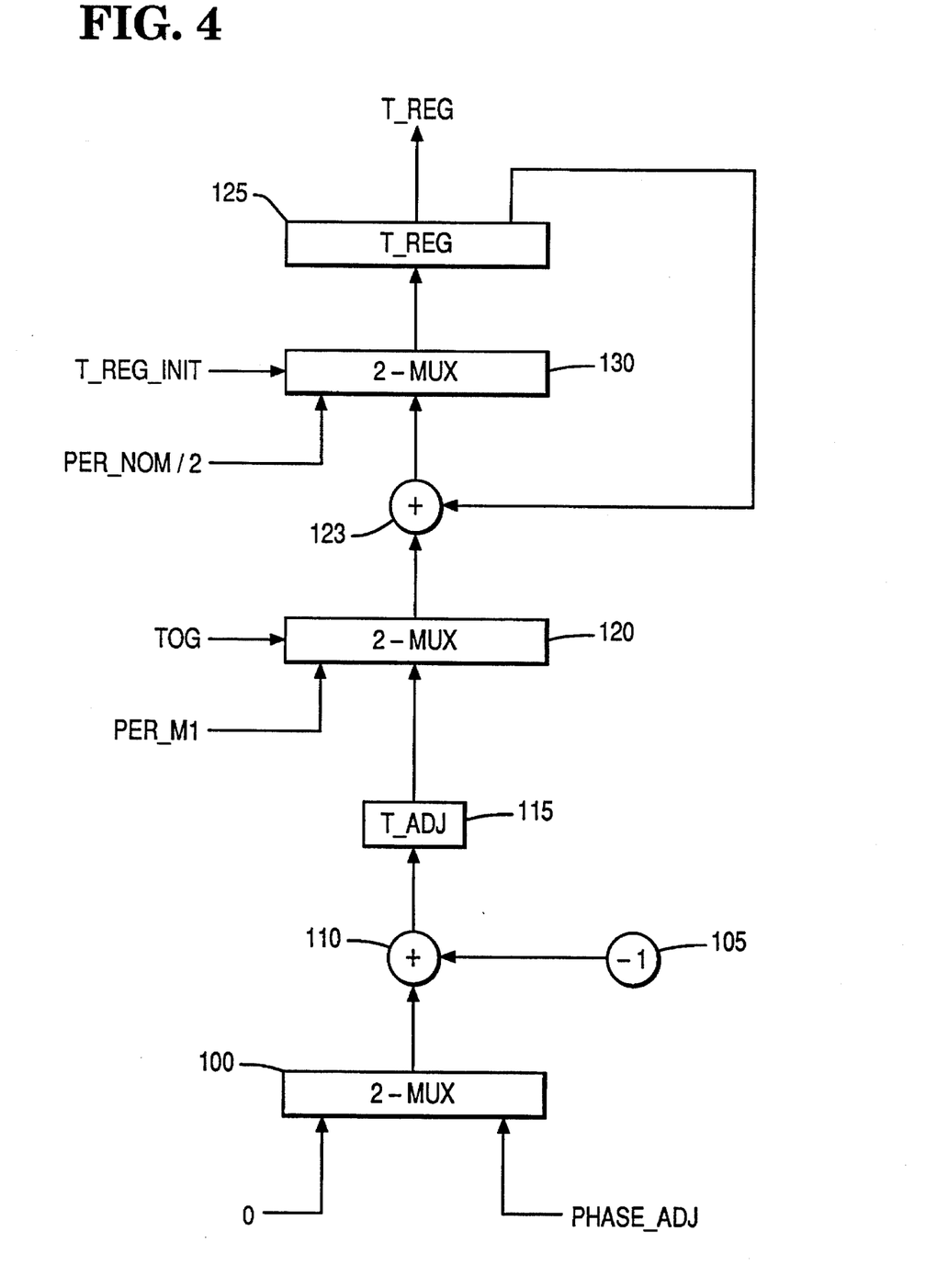
FIG. 4 is a flow diagram which depicts one way in which a phase adjustment is performed.

FIG. 4 is a flow diagram which depicts one way in which the phase adjustment described earlier in detail is performed. Either a phase adjustment (PHASE_ADJ) or no phase adjustment (0) is performed as indicated by the two inputs to multiplexer 100. If a phase adjustment is to be performed, then a negative one (block 105) is added (block 110) or loaded into T_ADJ (block 115). Either the value thus stored as T_ADJ or PER_M1 (the period minus one) is toggled via multiplexer 120 as shown. The resultant value at adder block 123 or PER_NOM/2 is toggled into the T_REG register (block 125) in response to a T_REG_INIT initialization signal as indicated at multiplexer 130. The T_REG value is fed back to adder block 123 as shown.

Figure 5:
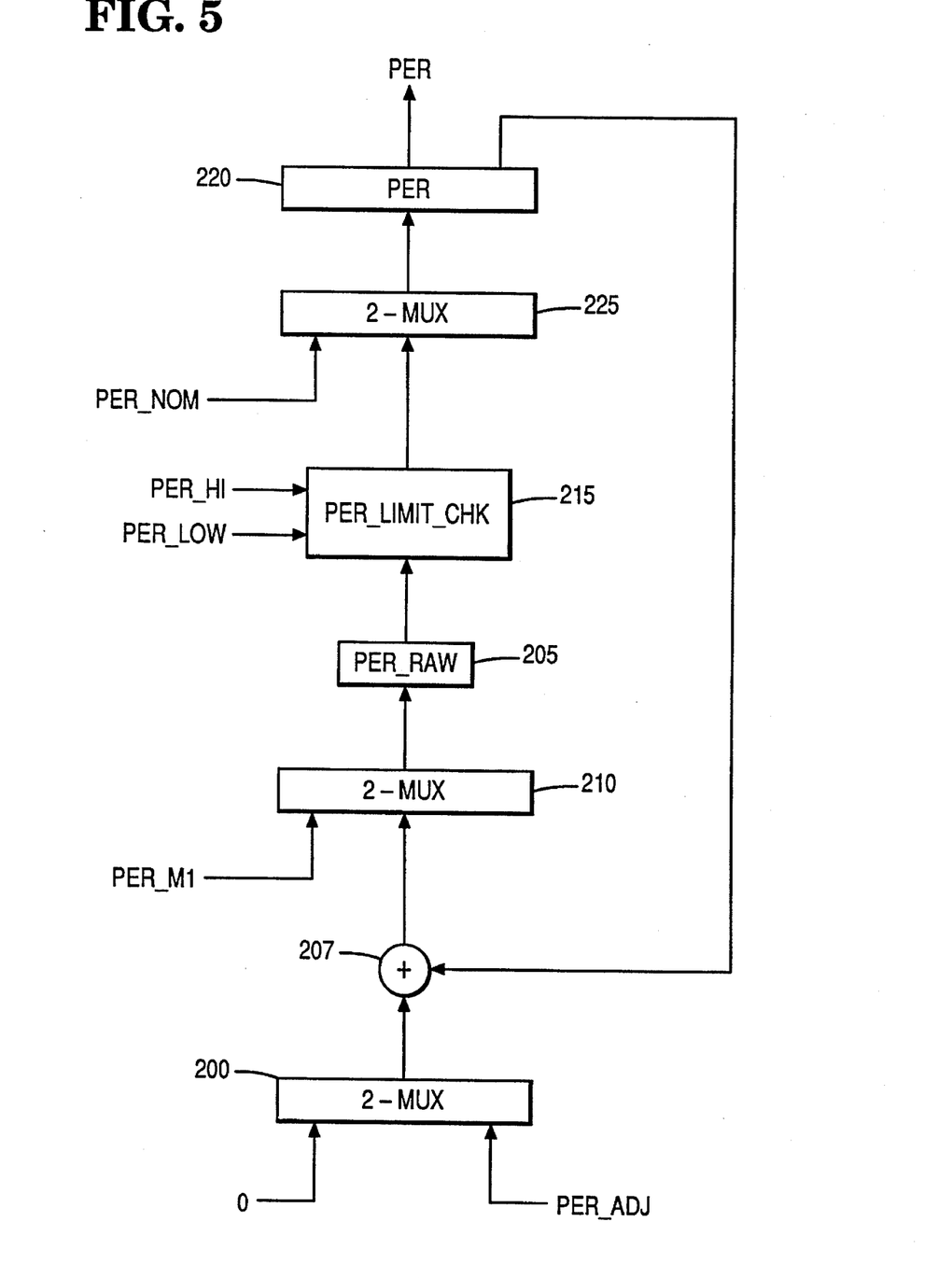
FIG. 5 is a flow diagram which depicts one way in which a DELAY or period adjustment is performed.

FIG. 5 is a flow diagram which depicts one way in which the period adjustment described earlier in detail is performed. Either a period adjustment or no period adjustment (0) is performed as indicated by the two inputs to multiplexer 200. If a period adjustment is to be performed, then either the value PER_M1 (period minus one) is loaded into PER_RAW (block 205) or the present period is loaded (PER) (via adder block 207) is loaded into PER_RAW as indicated by the two inputs to multiplexer 210. The resultant value in PER_RAW is then limit checked to see if it is between the PER_HI and PER_LO limits at limit check block 215. Either the resultant limited value or the PER_ NOM (nominal period) is provided to the PER register (block 220) as indicated by the two inputs to multiplexer 225. The resultant value in the PER register is fed back to adder block 207 as shown.

Figure 6:
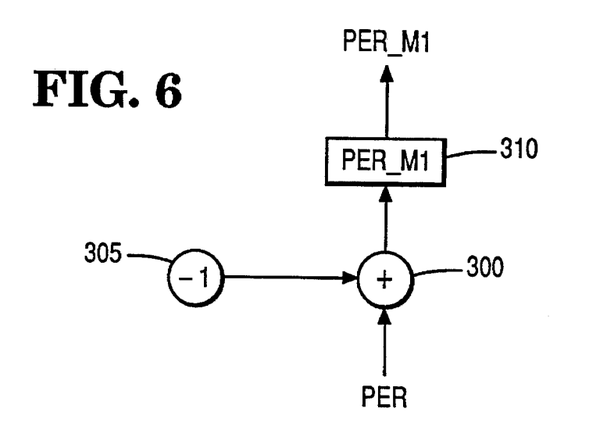
FIG. 6 is a flow diagram which shows how a period minus one operation is performed.

FIG. 6 is a flow diagram which depicts one way to perform the earlier described operation of calculating PER_ M1 by adding (block 300) a negative one (block 305) to PER to determine PER_M1 (block 310), namely the period minus one.

Figure 7A:
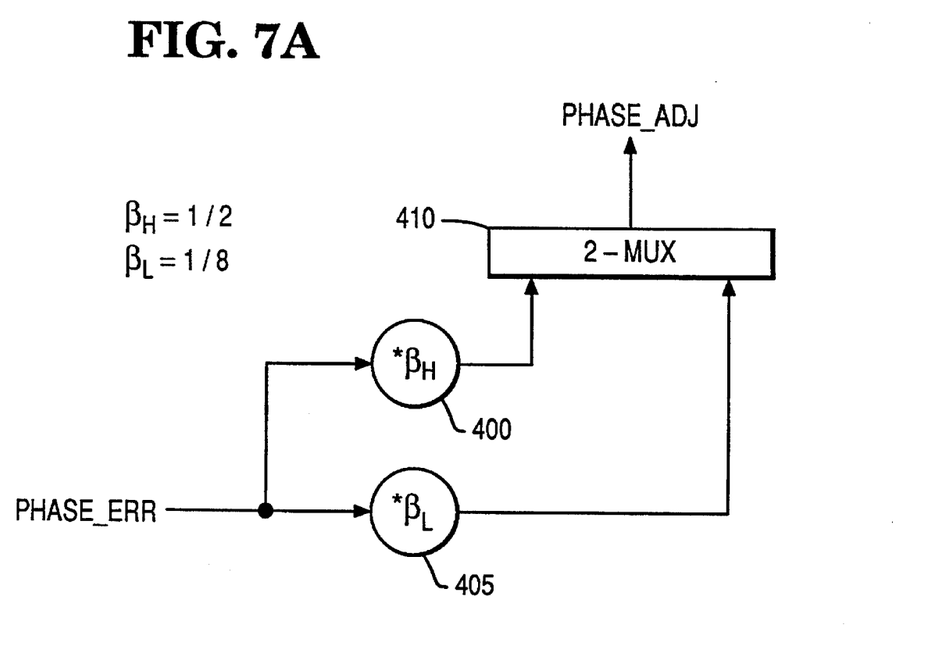
FIGS. 7A and 7B are flow diagrams which show feedback parameters used to adjust phase and period, respectively.
Figure 7B:
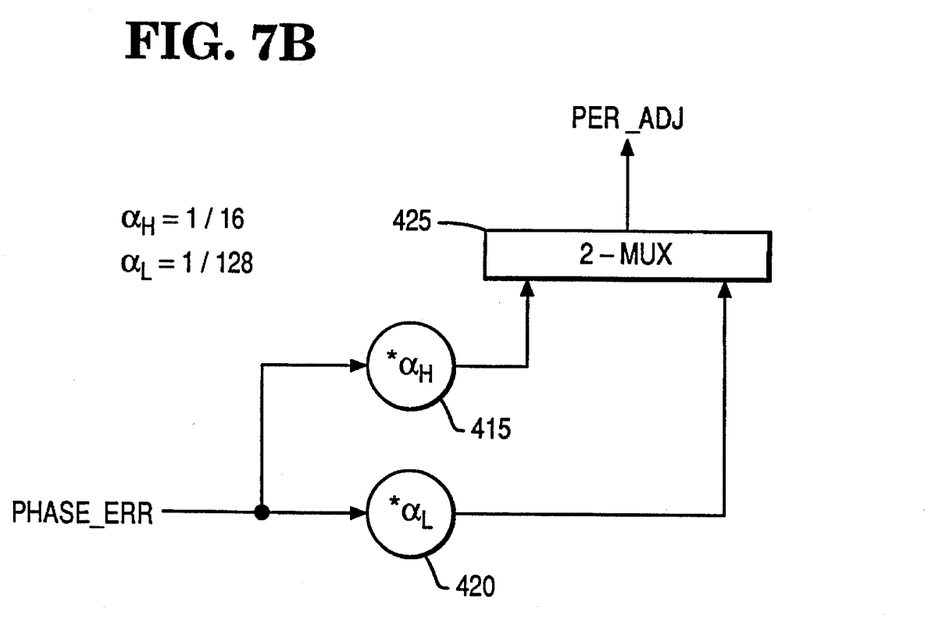

FIGS. 7A and 7B are flow diagrams which depict generation of the PHASE_ADJ signal and the PER_ADJ signal from the PHASE_ERR signal. The PHASE ERROR signal is multiplied by the parameter $\beta_H$ (block 400) and the parameter $\beta_L$ (block 405) as shown. The resultant values are respectively provided to the two inputs of a two input multiplexer 410. The output of multiplexer 410 provides the PHASE_ADJ value or signal. In this particular embodiment, feedback parameter values of $\beta_H=½$ and $\beta_L=⅛$ were used.

To generate the DELAY signal, the PHASE_ERROR signal is multiplied by the parameter $\alpha_H$ (block 415) and the parameter $\alpha_L$ (block 420) as shown. The resultant values are provided to the two inputs of a two input multiplexer 425. The output of multiplexer 425 provides the DELAY value or signal. In this particular embodiment, feedback parameter values of $\alpha_H=1/16$ and $\alpha_L=1/128$ were used.

Figure 8:
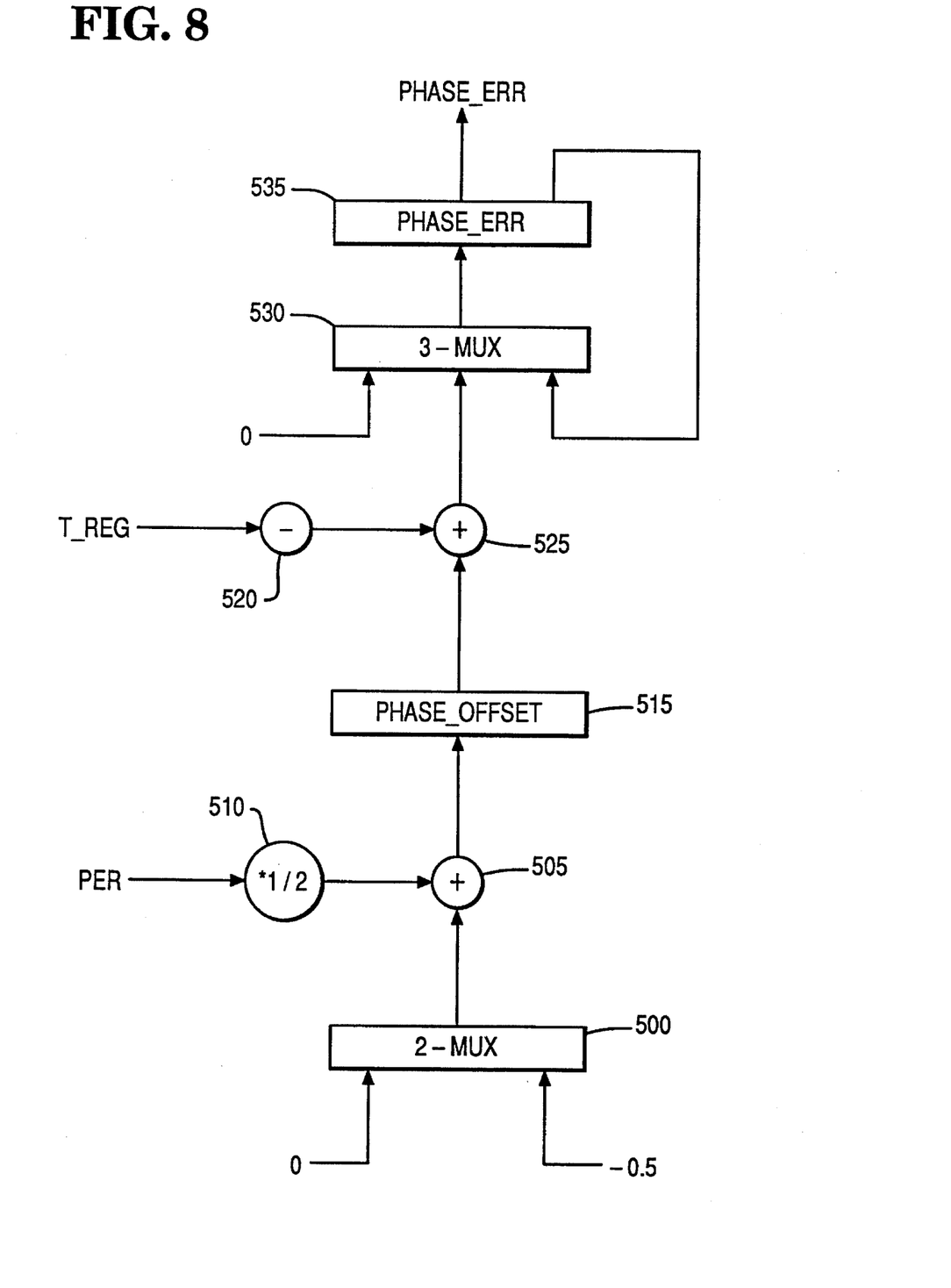
FIG. 8 is a flow diagram which describes the generation of the PHASE_ERR signal or value.

FIG. 8 is a flow diagram which describes generation of the PHASE_ERR signal or value. As described earlier, either a value of 0 or 0.5 are selected via multiplexer 500. The resultant value is added (block 505) to the product of period PER times ½ (block 510). The result of this addition is loaded as the PHASE_OFFSET (block 515). The T_REG value is subtracted (blocks 520 and 525) from the PHASE_ OFFSET and the result is loaded into one input of a three input multiplexer 530. A zero is provided to one of the other inputs of multiplexer 530. The PHASE_ERR value is the output value (block 535) of multiplexer 530 and is fed back to the remaining third input of multiplexer 530 as shown.

While the above description sets forth an apparatus for separating clock information and data from a digital data stream, it is clear that a method of separating the clock information and data from a digital data stream is also disclosed. More particularly, a method is provided for separating data and clock information from a data stream containing data input pulses which are clocked at a predetermined clock cycle rate. The disclosed method includes the steps of generating a read data window for the data stream and storing a current best estimate of the duration of the read data window in a period register as a period register value. The method also includes the step of loading the period register value minus one into a time register, the value in the time register being designated the time register value. The method further includes the step of performing a count down cycle by subtracting a value of one from the time register value in each clock cycle during the course of the count down cycle. Still further, the method includes the step of toggling the read data window to begin a new read data window when the time register value is near zero, the value remaining in the time register being designated the remaining value.

The foregoing has described a digital data separator which is capable of separating clock information and data from a digital data stream which is subject to undesired jitter and speed variations. The disclosed data separator exhibits significant tolerance to varying amounts of jitter.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A method for generating a read data window for separating data and clock information from a data stream, the method comprising the steps of:

maintaining a period value;

maintaining a time value;

modifying the time value based upon the period value;

adjusting the time value during each of a plurality of clock cycles; and generating a read data window based upon the adjusted time value.

2. The method of claim 1 wherein the step of generating a read data window includes generating a read data window when the time value is less than approximately 0.5.

3. The method of claim 1 wherein the step of generating a read data window includes generating a read data window when the time value is less than approximately 0.

4. The method of claim 1 further comprising the step of adding the period value to the adjusted time value to begin a new count cycle.

5. The method of claim 4 wherein the data information comprises data pulses, and further comprising the step of determining a phase error of the data information by measuring the arrival time of each data pulse with respect to a center of the read data window.

6. The method of claim 5 wherein the step of determining the phase error step includes subtracting the time value, when a data input pulse is received, from one half the period of the read data window, the result being designated as the phase error.

7. The method of claim 5 wherein the step of determining the phase error includes subtracting the time, when a data input pulse is received, from the quantity of one half the period of the read data window minus approximately 0.5, the result being designated as the phase error.

8. The method of claim 6 further comprising the step of storing the phase error in a phase error register.

9. The method of claim 6 further comprising the step of updating the period value with the phase error.

10. The method of claim 6 further comprising the step of updating the time value with the phase error.

11. The method of claim 6 further comprising the step of updating the period value with the product of the phase error times a feedback parameter.

12. The method of claim 6 further comprising the step of updating the time value with the product of the phase error times a feedback parameter.

13. A method for generating a read data window for separating data and clock information from a data stream, the method comprising the steps of:

generating a read data window for the data stream;

storing an estimate of the duration of the read data window in a period register as a period register value;

loading a value relative to the period register value into a time register, the value in the time register being designated the time register value;

performing a count down cycle by decrementing the time register value in each clock cycle during the course of the count down cycle; and adjusting the read data window to begin a new read data window when the time register value is near zero, the value remaining in the time register being designated a remaining value.

14. The method of claim 13 wherein the step of adjusting the read data window includes the step of adjusting the read data window when the time register value is less than approximately 0.5.

15. The method of claim 13 wherein the step of adjusting the read data window includes the step of adjusting the read data window when the time register value is less than approximately 0.

16. The method of claim 13 further comprising the step of loading the period register value to the remaining value in the time register to begin a new count down cycle.

17. The method of claim 16 further comprising the step of determining a phase error of the data input pulses by measuring the arrival time of each pulse with respect to a center of the read data window.

18. The method of claim 17 wherein the step of determining the phase error step includes subtracting the value in the time register at the time a data input pulse is received from one half the period of the read data window, the result being designated as the phase error.

19. The method of claim 17 wherein the step of determining the phase error step includes subtracting the value in the time register at the time a data input pulse is received from the quantity of one half the period of the read data window minus approximately 0.5, the result being designated as the phase error.

20. The method of claim 18 further comprising the step of storing the phase error in a phase error register.

21. The method of claim 18 further comprising the step of updating the period register with the phase error.

22. The method of claim 18 further comprising the step of updating the time register with the phase error.

23. The method of claim 18 further comprising the step of updating the period register with the product of the phase error times a feedback parameter.

24. The method of claim 18 further comprising the step of updating the time register with the product of the phase error times a feedback parameter.

25. A digital data separator for generating a window for separating data and clock information from a data stream comprising:

a datapath to which input data is provided;

a window generator, operatively coupled to the datapath, for generating a read data window for the data stream;

a period register, operatively coupled to the datapath, for storing an estimate of the duration of the read data window as a period register value;

a time register, operatively coupled to the datapath, into which a value relative to the period register value is loaded, the value in the time register being designated a time register value;

a down counter, coupled to the datapath, for performing a count down cycle by decrementing the time register value in each clock cycle during the course of the count down cycle; and a window block generator, coupled to the datapath, for beginning a new read data window when the time register value is near zero.

* * * * *